United States Patent [19]

Tyson, II et al.

[11] Patent Number: 5,094,528

[45] Date of Patent: Mar. 10, 1992

[54] APPARATUS AND METHOD FOR PERFORMING ELECTRONIC SHEAROGRAPHY

[75] Inventors: John Tyson, II, Wayne; John W. Newman, Berwyn, both of Pa.

[73] Assignee: Laser Technology, Inc., Norristown, Pa.

[21] Appl. No.: 528,474

[22] Filed: May 25, 1990

[51] Int. Cl.$^5$ .............................................. G01L 1/24

[52] U.S. Cl. .................................. 356/35.5; 356/345; 356/353

[58] Field of Search ................. 356/35.5, 353; 73/800, 73/815; 358/107

[56] References Cited

U.S. PATENT DOCUMENTS

| | | | |
|---|---|---|---|
| 3,816,649 | 6/1974 | Butters | 356/93 |
| 3,829,219 | 8/1974 | Wyant | 356/353 |
| 4,139,302 | 2/1979 | Hung | 356/32 |
| 4,280,764 | 7/1981 | Sica, Jr. et al. | 356/35.5 |
| 4,427,295 | 1/1984 | Nishiyama | 356/371 |
| 4,620,223 | 10/1986 | Haskell | 358/107 |
| 4,682,892 | 7/1987 | Chawla | 356/353 |
| 4,690,552 | 9/1987 | Grant | 356/35.5 |
| 4,702,594 | 10/1987 | Grant | 356/35.5 |
| 4,887,899 | 12/1989 | Hung | 356/35.5 |

OTHER PUBLICATIONS

Hung, "Speckle-Shearing Interferometer: A Tool for Measuring Derivatives etc.", Optics Communications, vol. 11, p. 732 (1974).
Hung, "Shearography: A New Optical Method for Strain Measurement and Nondestructive Testing", Optical Engineering, May–Jun. 1982, pp. 391–395.
Nakadate et al: "Digital Speckle-Pattern Shearing Interferometry"-Applied Optics, Dec. 15, 1980, pp. 4241–4246.
Hung et al: "Speckle-Shearing Interferometric Technique: A Full-Field Strain Gauge", Applied Optics, Mar. 1975, pp. 618–622.
Hung et al: "Measurement of Slopes of Structural Deflections by Speckle-Shearing Interferometry", Experimental Mechanics, 7/74, pp. 281–285.
Murty et al: "Liquid Crystal Wedge as a Polarizing Element and Its Use in Shearing Interferometry", Otpical Engineering, Jan.–Feb. 1980, pp. 113–115.
Hung et al: "Image-Shearing Camera for Direct Measurement of Surface Strains", Applied Optics, Apr. 1, 1979, pp. 1046–1051.
Celaya et al: "Incoherent Processor for Restoring Images Degraded by a Linear Smear", Applied Optics, 7/15/78, pp. 2191–2197.
Hariharan: "Speckle-Shearing Interferometry: a Simple Optical System" Applied Optics, 11/75, p. 2563.
Mallick: "Spatial Differentiation by a Lateral Shear Interferometer", Applied Optics, 2/72, pp. 479–480.
Balas: "Some Applications of Experimental Analysis of Models and Structures", Experimental Mechanics, Mar. 1967, pp. 127–139.

*Primary Examiner*—Samuel A. Turner
*Assistant Examiner*—LaCharles P. Keesee
*Attorney, Agent, or Firm*—William H. Eilberg

[57] ABSTRACT

Two laterally-displaced images of a test object interfere with each other to form a shearogram. Two shearograms, taken while the object is unstressed and stressed, respectively, are compared electronically to yield a composite interference pattern. According to the invention, each shearogram is formed by the interference of pairs of distinct rays of coherent light, reflected from different points on the object. The first ray of each pair is reflected from the object, strikes a mirror spaced from the object, and is reflected from the mirror. At the same time, the second ray of each pair is reflected from the object and strikes a beam splitter positioned beside the mirror. The beam splitter directs a portion of the second ray in the same direction as the reflected first ray, and a portion of the first ray passes through the beam splitter without being reflected. Since the two rays have the same polarization angle, and are mutually parallel, the rays interfere. A detector is positioned to receive light from the beam splitter. The detector observes the interference between pairs of rays over the entire field of view, and the result is an interference pattern, i.e. a shearogram, formed from the optical interference of the two laterally-displaced images of the object. The amount of shearing can be controlled by varying the angle of the mirror. Subsequent computer processing can be used to compare the shearograms electronically. Such processing can include the averaging of several shearograms, taken sequentially, with different phase shifts induced by linearly moving the mirror.

22 Claims, 4 Drawing Sheets

APPARATUS AND METHOD FOR PERFORMING ELECTRONIC SHEAROGRAPHY

BACKGROUND OF THE INVENTION

This invention relates to the field of nondestructive testing. In particular, the invention relates to electronic shearography, which produces interference patterns generated by laterally-displaced images of an object.

Early laser-based systems for nondestructive testing used holography, wherein a beam reflected from the test object is made to interfere with a reference beam. Examples of patents showing holographic systems for performing such testing are U.S. Pat. No. 3,828,126 and U.S. Pat. No. 4,304,458. The major disadvantage of holography is that, by definition, it requires an object beam and a reference beam. Because two beams are needed, the optical arrangement is relatively complex. Moreover, a holographic system is especially sensitive to vibration. For these reasons, holography has been used mainly in the laboratory, and has not been satisfactory as a technique for inspecting manufactured parts in a factory environment.

The technique of shearing interferometry, or "shearography", has been recognized as a preferred alternative to holographic interferometry. In shearography, there is no separate reference beam. Instead, two images of the same object are made to interfere, forming a pattern that can be recorded. A first shearogram is taken while the object is in an unstressed condition, and another shearogram is taken while the object is stressed. Comparison of the two shearograms can reveal information about the strain concentrations (and hence the integrity) of the object.

Various methods have been proposed for using shearography in nondestructive testing. U.S. Pat. No. 4,139,302, the disclosure of which is incorporated by reference herein, is one example. In the latter patent, the shearing is accomplished by a wedge-shaped prism which lies along a portion of a lens. The light rays passing through the prism are displaced relative to those which do not pass through the prism. In this way, the system produces two laterally-sheared interfering images of the object.

While the apparatus shown in the latter patent (and in other comparable references) does produce acceptable results, it is not capable of generating interference patterns in "real time". The interference patterns generated must be recorded on a high-resolution photographic film. To obtain a shearogram, one must wait to develop the film, and must use film-developing chemicals. Thus, a film-based system cannot be used to view the instantaneous status of a test object.

In order to view a "real time" image, one must record the interference pattern with a video camera, or its equivalent. Until recently, it was virtually impossible to use a video camera to record shearograms because the spatial frequency of the interference patterns generated by the then known shearography methods was great, far beyond the resolving power of available video cameras.

The only known workable system for practicing shearography in "real time" is that described in U.S. Pat. No. 4,887,899, the disclosure of which is incorporated by reference herein. The latter patent is a remarkable advance over the prior art discussed above. It discloses a device which forms a shearogram by passing light, reflected from a test object, through a birefringent material and a polarizer. The birefringent material, which can be a calcite crystal, splits a light ray, reflected from a point on the object, into two rays, and the polarizer makes it possible for these rays to interfere with each other. It turns out that the spatial frequency of the shearogram produced with this arrangement is relatively low, because the effective angles between the interfering rays are small. Each shearogram is stored in a computer, or in an equivalent device, and the shearograms taken before and after deformation of the object are compared electronically. The result is a composite interference pattern which graphically shows the condition of the object. By storing the shearogram of the object in its initial, unstressed condition, and by comparing that shearogram, almost instantaneously, by computer, with further shearograms taken under varying levels of stress, a "real time" image of the resultant strains on the object can be observed.

As used herein, the term "electronic shearography" means a shearography process in which the interference patterns are recorded and analyzed electronically, as by a video camera, in contrast to processes which record patterns on photographic film. The above-described patent describes the first known commercially viable method for electronic shearography.

Although the system shown in U.S. Pat. No. 4,887,899 is commercially useful, it still has certain disadvantages. One of these is the inability to control easily the amount of shear (also called the "angle of shear"). The amount of shear is fixed, and is determined mainly by the optical properties of the birefringent material. But it is sometimes necessary to vary the amount of shear; a smaller angle of shear (i.e. in a system having reduced sensitivity) is preferable in a high-vibration environment, and conversely. To change the amount of shear, in the above-described system, one must replace the optical element. Also, the above-described system is subject to losses caused by attenuation of the light beams as they pass through the birefringent material and polarizer.

The present invention provides a new means of practicing electronic shearography. The invention solves some of the problems mentioned above. In particular, the invention makes it easier to adjust the amount of shearing, and thereby to adjust the sensitivity of the system, without replacing the optical element. The invention also tends to reduce the power requirements for the illuminating laser, because it minimizes the attenuation of the light reflected from the test object. The invention also allows the reflected beam to be phase-stepped, thereby providing more detailed information about the imaged strains.

SUMMARY OF THE INVENTION

According to the present invention, a source of coherent light, such as a laser, illuminates a test object. A mirror is positioned near the object, such that light reflected from the object is also reflected by the mirror. A beam splitter is positioned near the mirror, such that light reflected from the mirror passes through the beam splitter, and such that a portion of the light reflected from the object can also be reflected by the beam splitter. The arrangement of the mirror and beam splitter is such that light rays reflected from pairs of distinct points on the object are reflected, respectively, by the mirror and beam splitter, and are thus directed into parallel paths. A detector, such as a video camera or equivalent, is placed in the path of the light emerging from the beam splitter. The rays of light emerging from the beam splitter interfere with each other, virtually to the maximum degree possible, because they are parallel and have the same polarization angle. An interference pattern is observed at the detector, and stored in a computer, or its equivalent, for further processing.

The amount of shearing can be varied simply by adjusting the orientation of the mirror. When the orientation of the mirror is changed, a different set of distinct rays will interfere with each other. The latter is equivalent to a statement that the amount of shearing is varied. Varying the amount of shearing varies the sensitivity of measurement.

In an alternative embodiment, the light exiting the beam splitter is directed by a second mirror into the detector. This arrangement permits the detector to be positioned in the most convenient orientation.

In another alternative embodiment, there are two mirrors, disposed at or near adjacent sides of the beam splitter. One mirror may be linearly movable and the other mirror may be rotatable. Linear motion of the first mirror varies the phase angle of the interference pattern. Rotation of the second mirror varies the angle of shear. In this embodiment, the path lengths of the beams reflected from the mirrors are the same, or nearly the same, so that the coherent length requirement is reduced.

An interference pattern, made with any of the embodiments described above, is formed twice, once while the object is in an unstressed condition, and once while the object is stressed. The patterns could also be made at two different levels of stress. Each interference pattern is stored in the memory of a computer, or equivalent. The two interference patterns are then compared electronically to obtain a composite interference pattern. If the comparisons are performed by computer, the result can be a "real time" image showing changes in the object due to applied stress.

In another method of testing the object, one obtains shearograms, for the stressed and unstressed conditions, in the manner described above, for each of a plurality of linear positions of the mirror. The mirror can be moved to these positions by a piezoelectric phase-stepping mirror driver which changes the beam path length by fractions of a wavelength. The composite interference patterns obtained for each phase-shifted position are then averaged, to obtain a final composite interference pattern giving greater detail.

It is therefore an object of the present invention to provide a method and apparatus for performing electronic shearography.

It is another object to provide an optical apparatus for generating a shearogram.

It is another object to provide a method and apparatus for nondestructively analyzing manufactured parts.

It is another object to provide a method and apparatus for electronic shearography, wherein the amount of shearing can be easily and continuously varied.

It is another object to provide a two-mirror apparatus for electronic shearography, wherein one mirror can be linearly displaced to vary phase angle, and the other mirror can be rotated to vary the angle of shear.

It is another object to provide a two-mirror apparatus for electronic shearography, which apparatus reduces the coherent length requirement of the laser used to illuminate the test object.

It is another object to reduce the power losses in an electronic shearography system, and thereby to minimize the laser power required.

It is another object to provide a system and method for electronic shearography, wherein the detector can be oriented in whatever direction is most convenient.

It is another object to provide a method of electronic shearography which provides patterns representing the average of a plurality of shearograms, taken at various phase angles.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
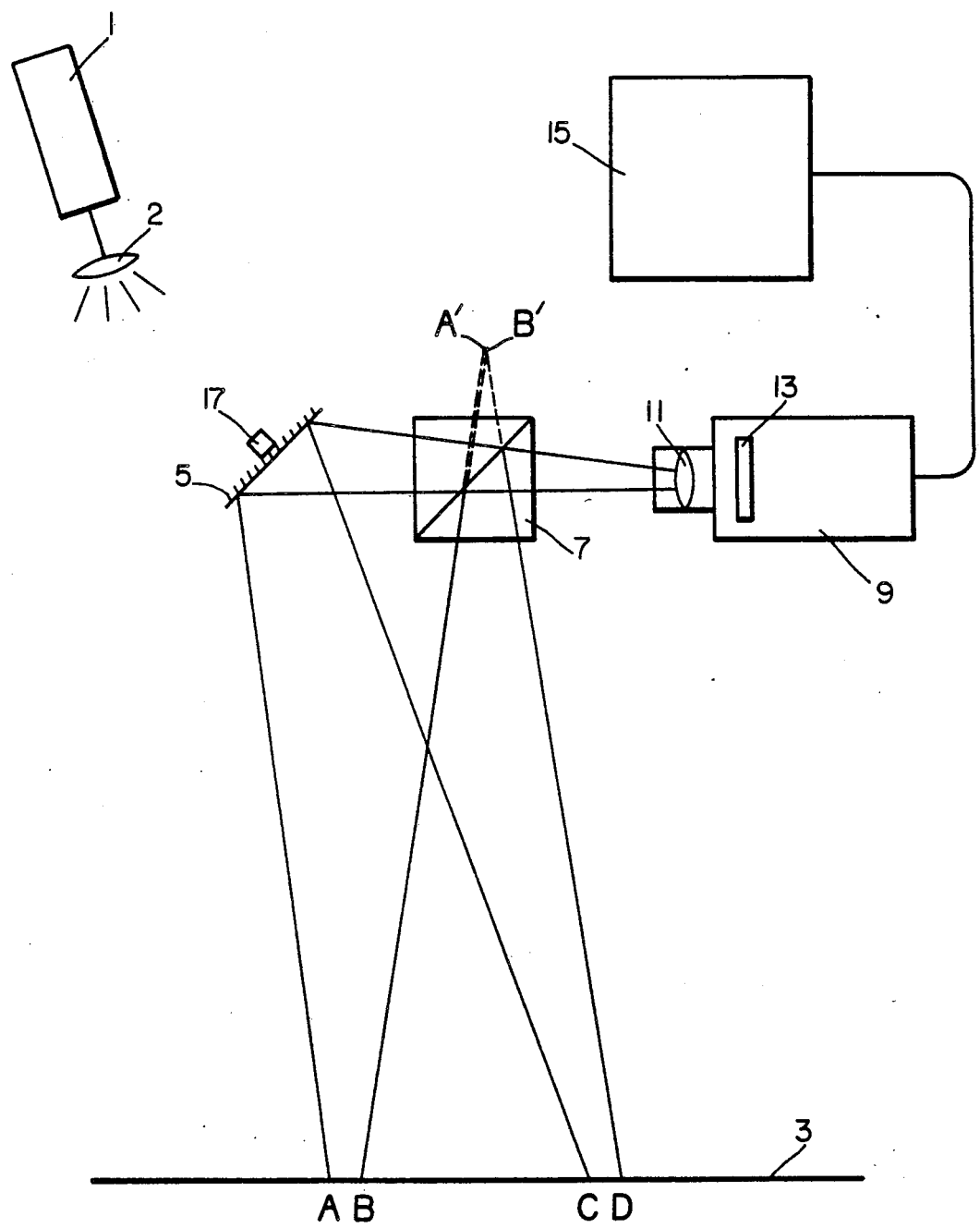
FIG. 1 is a schematic diagram illustrating the preferred embodiment of the present invention, and showing the paths of travel of four sample rays of light.

FIG. 1 is a schematic diagram of the preferred embodiment of the invention. Laser 1 directs coherent light onto the surface 3 of a test object. A beam expander 2 causes the light beam from laser 1 to diverge in the direction of the object. Mirror 5 and beam splitter 7 are positioned near the object, so as to receive light reflected therefrom. Detector 9 is positioned near the beam splitter, as shown. The detector is preferably a video camera, but it can be any device which is capable of detecting an image, virtually instantaneously, for subsequent digital processing. The detector includes lens 11 and photosensitive screen 13. Images are focused onto the screen by the lens. Detector 9 is connected to computer 15 which stores the images formed on the screen, and processes the stored images digitally.

FIG. 1 shows how the apparatus performs shearography. Consider the light reflected from two nearby points on the object, the points being labeled A and B. The reflected ray from point A strikes mirror 5, and is reflected by the mirror, and is directed towards beam splitter 7. One portion of the ray reflected from the mirror is transmitted through the beam splitter, towards detector 9, and the other portion, labeled A', is reflected, as indicated by the dotted line.

The beam splitter is represented symbolically as two prisms, joined along a common surface. In the preferred embodiment, the beam splitter is actually constructed of two prisms. However, the beam splitter is not limited to a particular structure; any device which transmits a portion of an incident ray, and reflects the remainder, can be used. Note also that, in general, the mirror is not parallel to the plane of the common surface of the prisms (which is the plane at which incident rays are reflected.)

The reflected ray from point B strikes beam splitter 7. One portion of that ray is reflected from the beam splitter, and the remainder, labeled B', is transmitted through the beam splitter, also indicated by a dotted line. The rays illustrated by the dotted lines (A' and B') are not of concern here. The reflected ray is reflected in a direction which coincides with that of the ray originating from point A. Thus, the reflected rays from points A and B are directed into the same path. Because both rays have been reflected exactly once, after being reflected from the object itself, both rays will have the same angle of polarization. Since their polarization angle is the same, and the wavefronts are parallel, these rays interfere with each other to the maximum extent possible. The interfering rays pass through lens 11 which focuses the rays onto screen 13.

If the interfering rays did not have the same angle of polarization, they would interfere only partially. Partial interference reduces the signal-to-noise ratio, as the components of the rays which do not interfere would add to the background signal, causing loss of sensitivity. It is absolutely necessary that the rays have polarization angles which are not mutually orthogonal; otherwise, the rays would not interfere at all. It is preferable that the polarization angles be equal, to maximize the signal-to-noise ratio.

A similar analysis applies in the case of rays reflected from points C and D. FIG. 1 therefore shows that the detector can observe a wide range of points on the object, and is not limited to only a small area.

From FIG. 1 and the above description, it follows that the image at each point on the detector screen comprises the superposition of two light rays reflected from two distinct points on the object. Therefore, what is observed at the detector is an interference pattern equivalent to the superposition of two laterally-displaced ("sheared") images of the object. In other words, the apparatus of FIG. 1 generates a shearogram.

The images formed in the detector are stored and processed by computer 15, or its equivalent. The processing steps can be essentially the same as those described in U.S. Pat. No. 4,887,899. As in the above-cited patent, shearograms can be taken while the object is in an unstressed condition, and while the object is stressed. Stressing the object at, say, point A, changes the effective path length of the beam reflected from point A, thus changing the phase angle between the rays reflected from points A and B. This change perturbs the interference pattern, and the change can be observed by comparing the two patterns.

Note that the shearograms can also be taken while the object is at two different conditions of stress, and is not limited to the special case in which the object is unstressed initially. It is therefore understood, throughout this specification, that wherever it is stated that shearograms are taken with the object in the "stressed" and "unstressed" conditions, the same could be done while the object is subjected to two distinct levels of stress.

Another useful procedure, described above with respect to U.S. Pat. No. 4,887,899, is to store the shearogram formed while the object is unstressed, and then to form and store shearograms repeatedly, in "real time", as the object is stressed. The computer is programmed to compare electronically the original shearogram (representing the unstressed condition) with the shearogram taken at a given instant, and to display the instantaneous results of the comparison on a video screen. Thus, the apparatus can display a "real time" image representing the current state of the object.

Two major advantages of the present invention arise from its ability to adjust the position of the mirror both rotationally and linearly. Changing the amount of shearing can be done simply by rotating mirror 5 slightly. In FIG. 1, mirror adjuster 17 can be used to vary the position of the mirror. It is understood that adjuster 17, as shown in the figure, represents any device or devices capable of causing linear and/or rotational movements of the mirror. Rotational movements cause variations in the amount of shearing; linear movements vary the path length of the light ray reflected from the mirror, and are useful in the technique described below.

The mirror adjuster can be a motor, a piezoelectric crystal, or any other device capable of causing large or small movements. Rotation of the mirror changes the set of points "A" which give rise to light which interferes with light from points "B". This is equivalent to saying that the relative displacement of the sheared images is varied. Note that the amount of shearing can thus be continuously varied.

The ability to vary the linear position of mirror 5 can also be exploited in the following method of analyzing interference patterns. The following method reduces "noise" in the final pattern, due to laser speckle. A piezoelectric crystal, or equivalent device, is used to move the mirror linearly, shifting the phase of the light from set of points "A". Each movement of the mirror is extremely small, i.e. a fraction of a wavelength. In one example, the mirror is "stepped" through four discrete positions, representing changes in the path length of one-quarter wave length. A shearogram is obtained for the first position, and is stored electronically. Then, a shearogram is obtained for each of the four quarter-wave positions while the object is stressed. Thus, four shearograms are taken for each of the four linear positions of the mirror, each shearogram being stored as before. Then, each phase-shifted shearogram is compared with the initial shearogram. That is, the shearogram taken in the first position, while the object is deformed, is compared with the stored shearogram taken while the object is undeformed. The same is done for each of the other mirror positions. Finally, the four composite patterns are averaged, or otherwise compared, or image processed, to obtain a final pattern. The final pattern has reduced speckle "noise". The method used to compare the shearograms taken for each given phase angle can simply be the subtraction of one pattern from the other, or it can be any of the other methods described in U.S. Pat. No. 4,887,899, or other methods.

In the above-described method, the number of times the mirror is "stepped" can be varied. In general, the greater the number of "steps", the greater the sensitivity of the method, and the longer the time required to perform the analysis.

In the above-described method, a piezoelectric crystal is preferred because it enables one to move the mirror by very small distances, of the order of a fraction of a wavelength, in a controlled manner, according to a voltage applied to the crystal. Piezoelectric crystals have been used, in other fields, for producing small controlled movements of objects, and such devices are therefore commercially available. However, the above-described method is not limited to the use of a piezoelectric crystal.

Another advantage of the present invention is that it makes efficient use of the radiation reflected from the object. This point is more clearly illustrated in FIG. 2.

Figure 2:
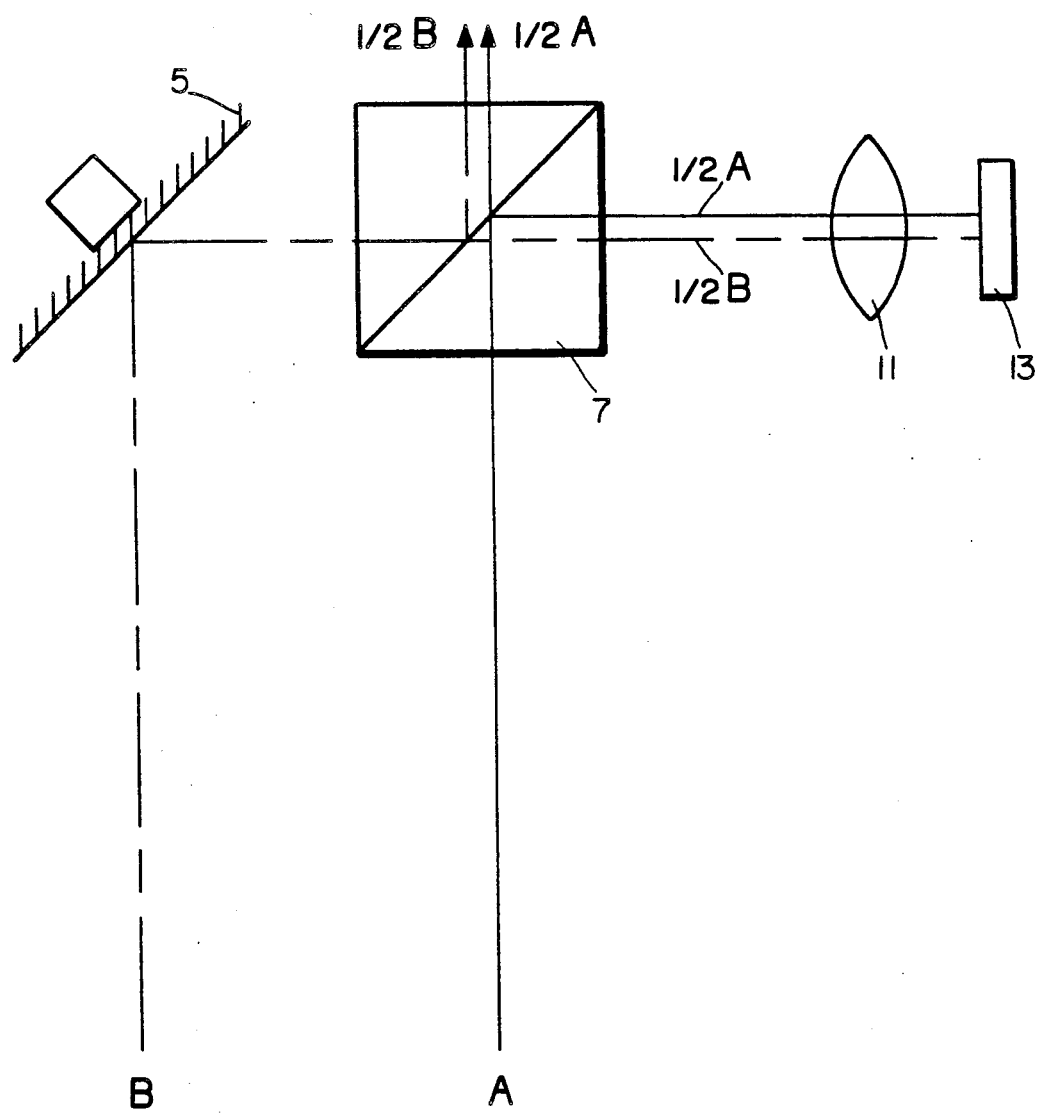
FIG. 2 is a schematic diagram showing the optical components of the invention, and showing an approximate determination of the intensity of the interference pattern at the detector.

For the sake of simplicity, FIG. 2 shows only two rays, labeled A and B, reflected from the object (not shown in FIG. 2). Also, the source of coherent radiation is omitted from FIG. 2.

In FIG. 2, ray A enters beam splitter 7. Approximately one half of ray A is transmitted and the other half is reflected. The reflected ray travels towards lens 11, which focuses the ray onto screen 13. At the same time, ray B is reflected from mirror 5, onto the beam splitter. Approximately one half of ray B is reflected by the beam splitter, and the other half is transmitted through the beam splitter, towards lens 11, and eventually onto screen 13. Thus, the intensity of the radiation received at the screen can be represented as 0.5A+0.5B. Since A and B are approximately equal (both rays originate from the same source, and are reflected from the same object), it follows that the intensity observed at a point on the screen, due to the interference of two rays, is approximately equal to the intensity of one of the rays reflected from the object. Thus, the amplitude at the detector is of comparable magnitude to the amplitude of the light reflected from the object.

The above-described feature contrasts with the shearography systems of the prior art, wherein the optical elements inherently cause substantial attenuation of the light reflected from the object. By reducing the attenuation, one reduces the power requirements of the laser.

One requirement of the above-described embodiments of the present invention is that the laser have a relatively long coherent length. In general, the difference between the path lengths of the reflected beams must be no greater than the coherent length of the laser, i.e. the length beyond which the laser beam ceases to be coherent.

Figure 3:
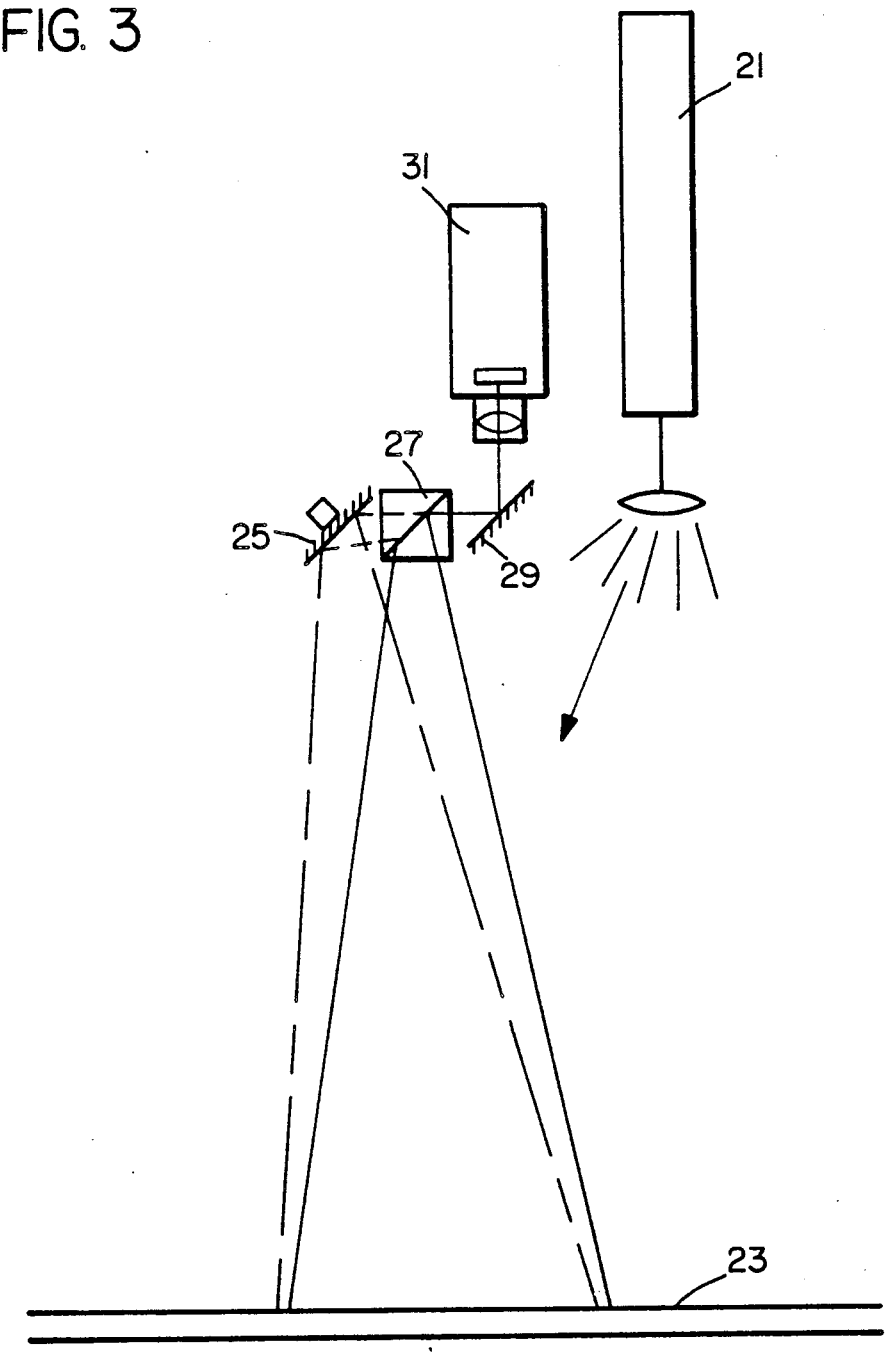
FIG. 3 is a schematic diagram showing an alternative embodiment of the invention.

FIG. 3 shows an alternative embodiment of the invention. In this embodiment, laser 21 illuminates object 23. Coherent light is reflected from the object onto mirror 25 and also onto beam splitter 27. A second mirror 29 directs light exiting the beam splitter into detector 31. This embodiment permits the detector to be "pointed" towards the object. This embodiment may be used where the available space is such that it is more convenient for the detector to be pointed towards the object. Also, mirror 29 can be oriented in other ways, depending on the position of the detector. Thus, FIG. 3 shows that the detector can be positioned in whatever manner is most convenient, the mirror 29 being used to direct the light from the beam splitter into the detector.

Figure 4:
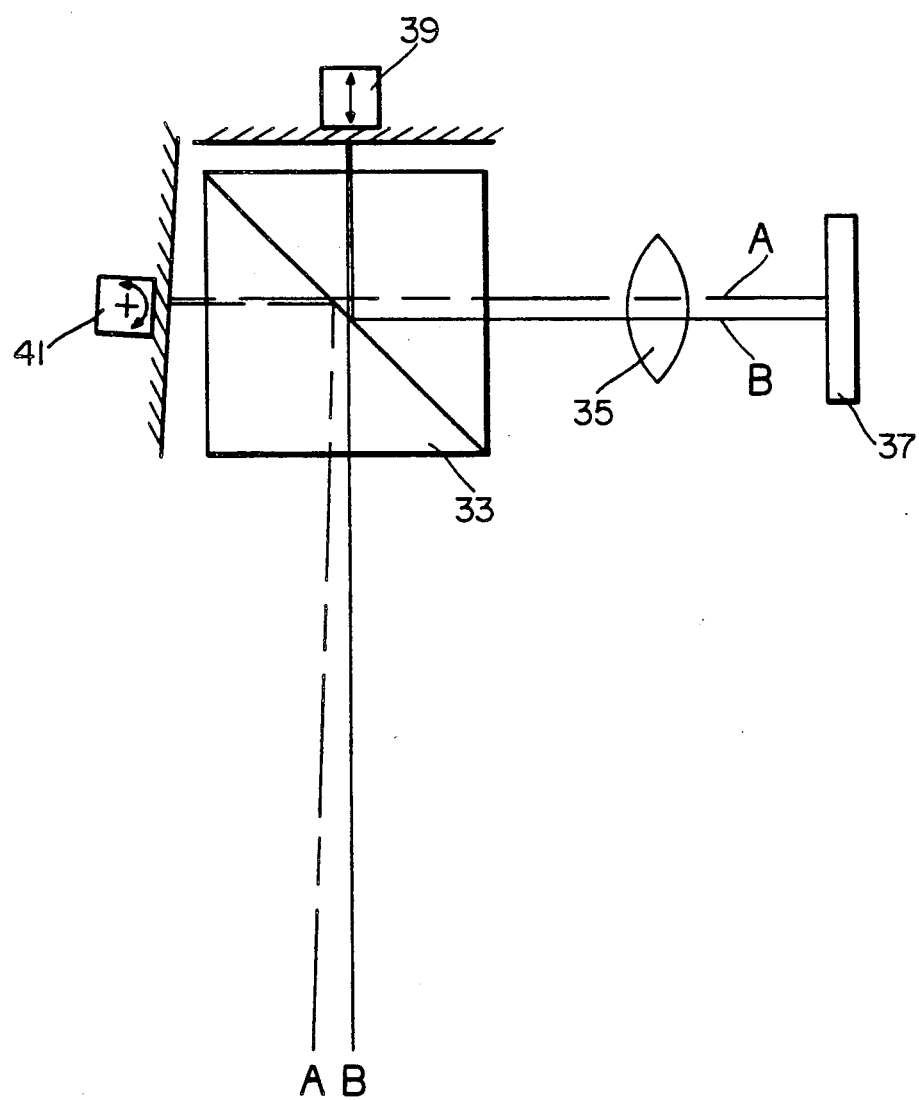
FIG. 4 is a schematic diagram showing another alternative embodiment of the invention, in which there are two mirrors disposed near adjacent sides of a beam splitter.

FIG. 4 illustrates another alternative embodiment of the invention. In this embodiment, there are two mirrors 39 and 41. Mirror 39 is linearly movable, as indicated by the arrows. Mirror 41 is rotatable, also as indicated by arrows. Beam splitter 33, lens 35, and screen 37 are similar to the corresponding components of the other embodiments.

FIG. 4 shows rays A and B, which originate from nearby points on the object. (For purposes of simplicity, neither the laser nor the object is shown in FIG. 4.) A portion of ray A is reflected from the beam splitter, and onto mirror 41. A portion of the reflected ray then passes through the beam splitter, towards the lens and screen. At the same time, a portion of ray B passes through the beam splitter, and is reflected from mirror 39. A portion of the reflected ray is reflected from the beam splitter, towards the lens and screen. Thus, the arrangement of FIG. 4 generates a shearogram. Note that FIG. 4 does not show the portions of the rays that are lost due to the beam splitter.

In the embodiment of FIG. 4, linear displacement of mirror 39 causes phase shifts, so that the apparatus of FIG. 4 can be used to practice the method, described above, wherein shearograms are taken at different phase angles. Rotation of mirror 41 changes the angle of shear, i.e. the amount of separation of the laterally-displaced images. As mentioned above, varying the amount of shear varies the sensitivity of measurement.

Note that the embodiment of FIG. 4 can be used even where the mirrors are not moved or rotated. Also, it is possible to make mirror 39 rotatable and mirror 41 linearly movable. It is also possible to make both mirrors linearly movable or to make them both rotatable. All of these alternatives are within the scope of the invention.

The advantage of the embodiment of FIG. 4, whether or not the mirrors are movable or rotatable, is that the path lengths of the rays originating from points A and B are the same, or almost the same. Therefore, the coherent length requirement of the laser is substantially reduced, as compared with the other embodiments.

While the invention has been described with respect to the embodiments discussed above, the invention can be modified in many ways. The particular means of analyzing the shearograms generated by the apparatus of the invention can be varied. It is also possible to vary the order in which shearograms for stressed and unstressed conditions of the object are taken. Additional mirrors can be added, to direct the interfering beams to the detector, if it is necessary to change the position of the detector, subject to the requirement that the total path length of the beams be less than the coherent length of the laser.

As discussed above, it is possible to make some or all of the mirrors of the apparatus adjustable, either by rotation or linear displacement, or both.

Except for the coherent length requirement, the invention is not limited by the type of laser used, or by the particular structure of the beam splitter. The invention can be used to test virtually any kind of opaque or translucent object. The invention is not limited to a particular type of detector, and could even be used with a film-based system, if desired. The above modifications, and other similar variations, should be deemed within the spirit and scope of the following claims.

What is claimed is:

1. Apparatus for performing electronic shearography, comprising:
    (a) means for generating a beam of coherent light, the beam generating means being positioned to direct the coherent light onto a test object,
    (b) means for expanding said beam of coherent light before said beam reaches the object,
    (c) a mirror located sufficiently near the object to receive light reflected from the object,
    (d) a beam splitter located sufficiently near the mirror and the object so that the beam splitter can receive light reflected from both the object and the mirror, the beam splitter being capable of transmitting a portion of a light ray incident thereon, and of reflecting another portion of said incident light ray, and
    (e) a video camera positioned to receive light from the beam splitter.

2. The apparatus of claim 1, further comprising image processing means for storing an image formed in the video camera, wherein an interference pattern is formed in the camera, and wherein the image processing means comprises means for comparing electronically two interference patterns so formed.

3. The apparatus of claim 1, further comprising a second mirror disposed to receive light from the beam splitter, and to reflect the light incident on the second mirror into the video camera, wherein the video camera receives light from the beam splitter.

4. The apparatus of claim 1, further comprising means for adjusting the angular position of the mirror.

5. The apparatus of claim 1, further comprising means for adjusting the linear position of the mirror.

6. The apparatus of claim 1, wherein the mirror is a plane mirror.

7. Apparatus for performing electronic shearography, comprising:
   (a) means for generating a beam of coherent light, the beam generating means being positioned to direct the coherent light onto a test object,
   (b) a mirror located sufficiently near the object to receive light reflected directly from the object,
   (c) a beam splitter located sufficiently near the mirror and the object so that the beam splitter can receive light reflected directly from the object and directly from the mirror, the beam splitter being capable of transmitting a portion of a light ray incident thereon, and of reflecting another portion of said incident light ray, and
   (e) a video camera positioned to receive light from the beam splitter.

8. The apparatus of claim 5, further comprising a second mirror disposed to receive light from the beam splitter and to reflect the light incident on the beam splitter into the video camera.

9. The apparatus of claim 5, further comprising image processing means for storing an image formed in the video camera, wherein an interference pattern is formed in the camera, and wherein the image processing means comprises means for comparing electronically two interference patterns so formed.

10. The apparatus of claim 5, further comprising means for adjusting the angular position of the mirror.

11. The apparatus of claim 5, further comprising means for adjusting the linear position of the mirror.

12. The apparatus of claim 5, wherein the mirror is a plane mirror.

13. Apparatus for performing electronic shearography, comprising:
   (a) a source of coherent light, the source being positioned to direct a beam of coherent light onto a test object,
   (b) means for expanding said beam before the beam reaches the object,
   (c) a beam splitter located sufficiently near the object to receive light reflected from the object, the beam splitter being capable of transmitting a portion of a light ray incident thereon, and of reflecting another portion of said incident light ray,
   (d) at least two mirrors located sufficiently near the beam splitter to receive light reflected by or transmitted from the beam splitter, wherein at least one mirror is rotatable, and wherein at least one mirror is linearly movable, and
   (e) a video camera positioned to receive light from the beam splitter.

14. A method of generating an interference pattern from two laterally-displaced images of a test object, the method comprising the steps of:
   (a) illuminating the object with coherent light,
   (b) reflecting a first beam of said coherent light directly from a first point on the object to a mirror, and transmitting said reflected first beam directly through a beam splitter and into a video camera,
   (c) reflecting a second beam of said coherent light directly from a second point on the object, the first and second points being close to each other, said second beam being reflected directly to the beam splitter, a portion of said second beam being reflected by the beam splitter such that said second beam is substantially parallel to said first beam, and such that said first and second beams interfere with each other, and
   (d) observing an interference pattern caused by said first and second beams generated for various pairs of points on the object, whereby the interference pattern represents the interference between two laterally-displaced images of the object.

15. The method of claim 14, further comprising the step of adjusting the linear position of the mirror so as to vary the length of the path of said first beam reflected from the mirror.

16. The method of claim 15, wherein the mirror is adjusted so as to record an interference pattern for a plurality of linear positions of the mirror, wherein interference patterns are obtained, for each of said linear positions, while the object is in both of two conditions of stress, the method further comprising the steps of deriving composite interference patterns from a comparison of patterns taken while the object is in two conditions of stress, for each given linear position of the mirror, and averaging the composite interference patterns so derived, to form a final interference pattern.

17. The method of claim 14, wherein the mirror is a plane mirror.

18. A method of generating an interference pattern from two laterally-displaced images of a test object, the method comprising the steps of:
   (a) illuminating the object with an expanded beam of coherent light,
   (b) reflecting a first beam of said coherent light from a first point on the object to a mirror, and transmitting said reflected first beam through a beam splitter and into a video camera,
   (c) reflecting a second beam of said coherent light from a second point on the object, the first and second points being close to each other, said second beam being reflected to the beam splitter, a portion of said second beam being reflected by the beam splitter such that said second beam is substantially parallel to said first beam, and such that said first and second beams interfere with each other, and
   (d) observing an interference pattern caused by said first and second beams generated for various pairs of points on the object, whereby the interference pattern represents the interference between two laterally-displaced images of the object.

19. The method of claim 18, further comprising the steps of stressing the object, and repeatedly adjusting the linear position of the mirror so as to vary the length of the path of said first beam reflected from the mirror, and recording an interference pattern at each such position, while the object is stressed, and comparing each interference pattern obtained in the recording step with the pattern obtained in step (d), so as to obtain a plurality of composite interference patterns, and averaging said composite interference patterns obtained.

20. The method of claim 19, wherein the adjusting step comprises the step of displacing the mirror through a plurality of discrete positions, each position causing the path length of a ray reflected from the mirror to change by a fraction of a wavelength.

21. The method of claim 20, wherein the mirror is displaced through four quarter-wavelength positions.

22. The method of claim 18, wherein the mirror is a plane mirror.

* * * * *